United States Patent
Matsunaga (10) Patent No.: US 7,093,148 B2
(45) Date of Patent: Aug. 15, 2006

(54) MICROCONTROLLER OPERABLE IN NORMAL AND LOW SPEED MODES UTILIZING CONTROL SIGNALS FOR EXECUTING COMMANDS IN A READ-ONLY MEMORY DURING THE LOW SPEED MODES

(75) Inventor: Yasuhiro Matsunaga, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 566 days.

(21) Appl. No.: 10/368,489

(22) Filed: Feb. 20, 2003

(65) Prior Publication Data

US 2004/0044916 A1 Mar. 4, 2004

(30) Foreign Application Priority Data

Aug. 27, 2002 (JP) ............................. 2002-246566

(51) Int. Cl.
*G06F 1/32* (2006.01)
*G06F 12/00* (2006.01)
(52) U.S. Cl. ...................... 713/322; 713/310; 711/102; 711/104
(58) Field of Classification Search ..................... None
See application file for complete search history.

(56) References Cited

U.S. PATENT DOCUMENTS

| 5,592,634 | A | * | 1/1997 | Circello et al. ............. 712/239 |
| 6,374,124 | B1 | * | 4/2002 | Slabinski ................. 455/562.1 |
| 6,446,184 | B1 | | 9/2002 | Dell et al. |
| 6,449,203 | B1 | | 9/2002 | Cowles et al. |

\* cited by examiner

*Primary Examiner*—Lynne H. Browne
*Assistant Examiner*—Anand B. Patel
(74) *Attorney, Agent, or Firm*—Rabin & Berdo P.C.

(57) ABSTRACT

A microcontroller includes a clock circuit with a register storing clock frequency information corresponding to a low speed or normal mode respectively operated by a low frequency or normal clock, which outputs a first signal according to a value set in the register when the low speed mode is designated during operation in the normal mode, a DRAM holding data, in the low speed mode, by operation in a self-refresh mode, and outputting a confirmation signal indicating switching to that mode, a DRAM circuit switching the DRAM to that mode based on the first signal, a ROM operated in the low speed mode, a remap circuit controlling an address circuit based on the confirmation signal, and outputting a second signal for switching a program execution address from the DRAM to an address of the ROM to control an address space in which a program is executed, the address circuit switching the address space based on the second signal.

12 Claims, 6 Drawing Sheets

Fig. 1

PRIOR ART

Fig. 2

PRIOR ART

MICROCONTROLLER OPERABLE IN NORMAL AND LOW SPEED MODES UTILIZING CONTROL SIGNALS FOR EXECUTING COMMANDS IN A READ-ONLY MEMORY DURING THE LOW SPEED MODES

FIELD OF THE INVENTION

The present invention relates to a microcontroller provided with a control function to enable switching between a normal operation mode for operating a microprocessor by a normal clock frequency, and an extremely low speed operation mode for operating the microprocessor by an extremely low speed clock frequency.

BACKGROUND OF THE INVENTION

In recent years, along with the popularization of portable devices such as mobile telephones, a need has arisen to operate a microprocessor at low power consumption for a long time, and attention has been drawn to a technology for prolonging battery life, and dynamically changing an operation clock of the microprocessor in accordance with its operation mode to achieve low power consumption. However, promotion of a low speed of a clock frequency has increased effects on the portable devices. For example, a DRAM which is a mainstream memory at present must be refreshed by a fixed frequency or higher, and thus it cannot be operated by an extremely low speed clock of this frequency or lower.

Figure 1:
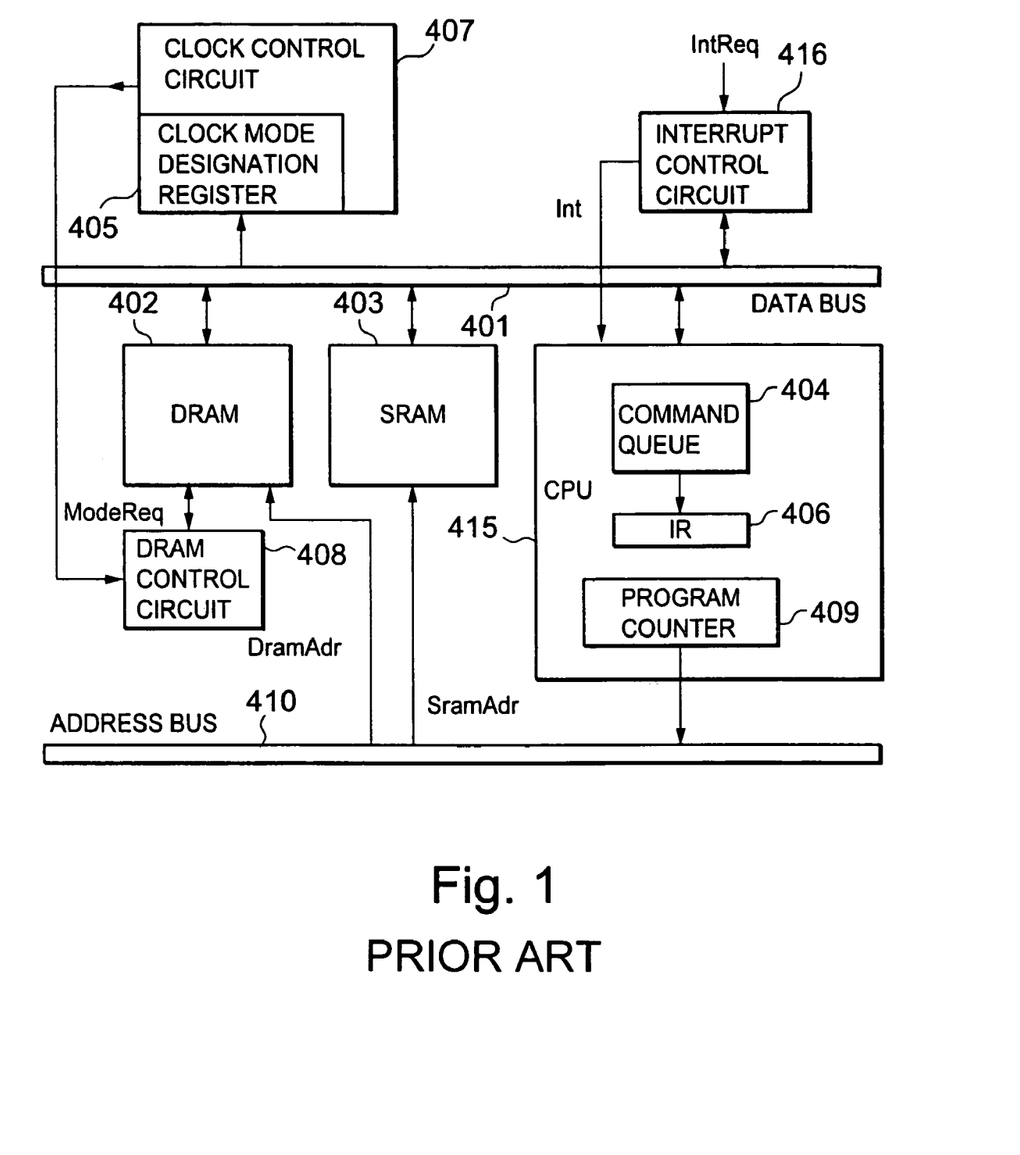
FIG. 1 is block diagram of a conventional microcontroller.

FIG. 1 shows an example of a conventional microprocessor having an extremely low speed mode. A central processing unit (CPU) 415, a dynamic random access memory (DRAM) 402, static random access memory (SRAM) 403, an interrupt control circuit 416, and a clock control circuit incorporating a clock mode designation register 405 are connected to a data bus 401. A not-shown read-only memory (ROM) is also connected.

As the DRAM 402 holds data by using a very small capacitor, the data is lost unless a refresh operation is periodically executed to save the data. If there is a lowest clock frequency for this refreshing, and a supplied clock frequency is lower than the clock lowest frequency, the DRAM 402 must be operated in a self-refresh mode to hold the data.

The SRAM 403 is operated at a low speed by low voltage. However, the price of using such SRAM is high because of a large pattern area per bit, and there is a limit, i.e., only a small-capacity SRAM can be loaded on a chip such as a microprocessor.

A command queue 404 is normally first in, first out (FIFO), stores commands to be executed in order, and sends a command to be executed next to a command register IR 406. A program counter 409 is a register for designating an address of the command to be executed next, and counts in accordance with the number of bytes of the command. The address is outputted to an address bus 410, and an address DramAdr of the DRAM 402 and an address SramAdr of the SRAM 403 are supplied. An address RomAdr of the ROM is also supplied.

Normally, as a method for switching the DRAM 402 to an extremely low speed mode, there is a method for setting a value corresponding to an operation mode in the clock mode designation register 405 to change the mode of the CPU to the extremely low speed mode using the clock control circuit 407. Upon reception of the designation, the clock control circuit 407 supplies a clock of a frequency corresponding to the designation to each part of the microcontroller. After the clock control circuit 407 enters an extremely low speed clock mode designation signal ModeReq to a DRAM control circuit 408, the DRAM control circuit 408 switches the DRAM to a self-refresh mode.

The interrupt control circuit 416 receives an internally or externally generated interrupt request signal IntReq, and then outputs an interrupt signal Int to the CPU 415. Upon receipt of the request, the CPU 415 jumps to an interrupt processing routine to execute processing in accordance with an interrupt factor thereof. Regarding interrupt factors, interruption by an internal factor, for example interruption when a command inexcutable because of a memory abnormality is executed, or interruption by an external factor, for example timer interruption, interruption from a keyboard or the like, is conceivable. Here, the interruption is used to return the CPU 415 from an extremely low speed operation mode to a normal operation mode.

Figure 2:
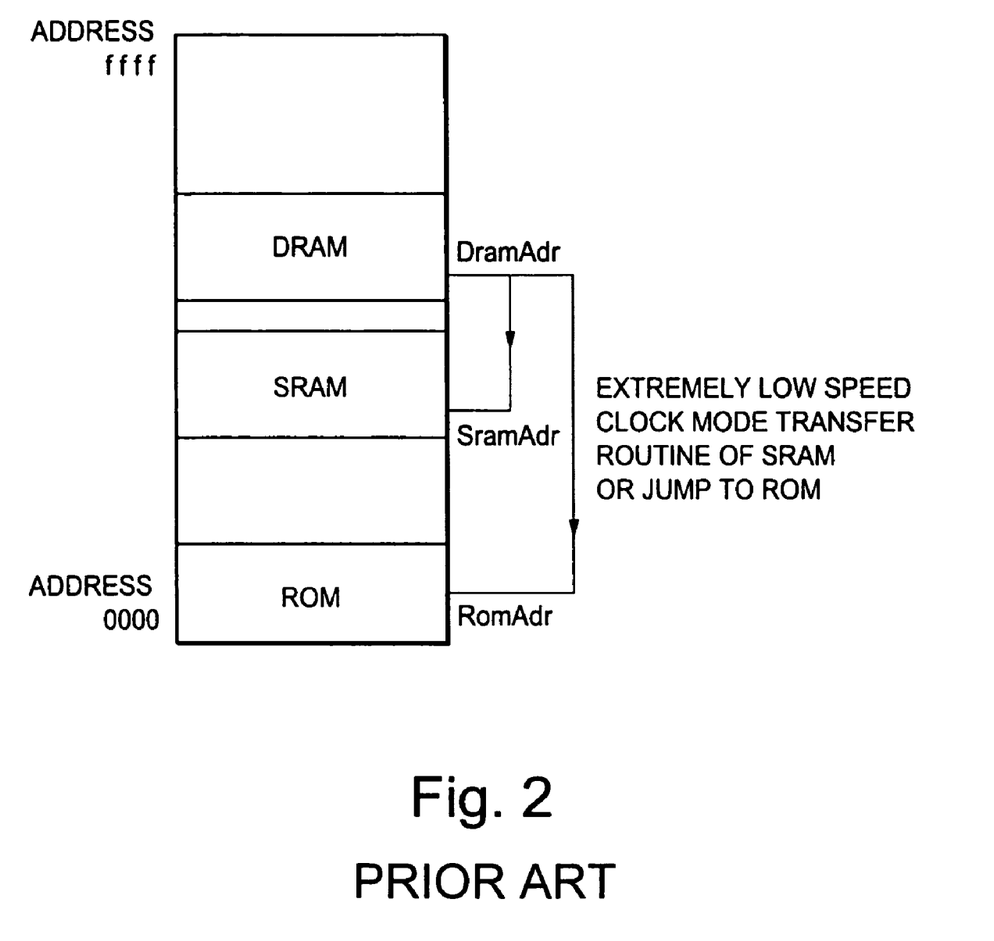
FIG. 2 is an explanatory view of an address space in the conventional microcontroller.

Now, description is made of a process until the conventional microcontroller shown in FIG. 1 is operated by an extremely low speed clock. FIG. 2 is a conceptual diagram showing an address space where the conventional microcontroller of FIG. 1 is operated. In FIG. 2, in the address space, addresses start from a lowest address of 0x000, and a highest address is 0xffff. A program originally placed on the ROM is copied in the DRAM by a loader, and executed at a high speed. However, as the DRAM is switched to a self-refresh mode by an extremely low speed clock, execution of the program becomes impossible. Thus, to switch to an extremely low speed mode, the operation is jumped to an extremely low speed mode switching routine in the SRAM 403. That is, the operation is jumped from an address DramAdr of a jump command in the DRAM to a head address SramAdr of the extremely low speed mode switching routine in the SRAM. In the extremely low speed mode switching routine, processing necessary for the switch is executed, and the program is executed in the SRAM until the mode is released. Thus, the program in the SRAM can be set to be identical to the program in the DRAM. The extremely low speed mode can be released by a command in the SRAM, or an interrupt routine for the CPU 415. However, this interrupt routine must be loaded on the SRAM. Another method for switching to an extremely low speed mode is to jump an operation to a ROM operated even by an extremely low speed clock. In this case, the operation is jumped to a head address RomAdr of a corresponding processing routine in the ROM.

For the conventional extremely low speed mode, the SRAM 403 that often has been used has been high in price, low in capacity, and unloadable on the chip. Even if copies of almost all the programs in the DRAM can be loaded on the SRAM 403, the capacity of the SRAM consumed becomes impractically high. In addition, a method of installing the SRAM outside the microcontroller is expensive to execute, and a system for carrying it out becomes complex. Use of a ROM in this respect is inexpensive, and a high capacity is easily achieved.

However, in all of the above-described methods, a considerable number of processing steps must be executed to switch between the extremely low speed mode and the normal mode and, therefore, immediacy is lost. This is described more in detail by way of a specific example. According to this example, if there is a need to take out data because of an external factor (high speed data reception) during operation in an extremely low speed mode, interrupt processing is executed to return to a normal operation mode, and then data is received by an operation in the normal mode. In this case, until the return to the normal mode (e.g., operation mode by a clock of 20 MHz), a program is executed in an extremely low speed mode (e.g., operation mode by a clock of 2 MHz). Thus, assuming that an interrupt processing routine is constituted of thirty steps, and processing to return to the normal mode is constituted of twenty steps, 25 µs are expended in the extremely low speed mode. If there are serial communications executed at 500 Kbps (data cycle 20 µs when a data length is 8 bits, and each of start and stop bits is 1), communication errors occur on the extremely low speed mode.

Thus, if the conventional processing for operation mode switching between the extremely low speed mode and the normal operation mode is executed by software interrupt processing, immediacy is lost to complete processing in time, creating a problem of erroneous operations.

SUMMARY OF THE INVENTION

The present invention provides a microcontroller capable of executing operation mode switching between an extremely low speed mode and a normal operation mode without losing immediacy. Thus, a microcontroller of the present invention comprises a clock control circuit provided with a clock mode designation register for storing clock frequency information corresponding to an extremely low speed mode for an operation by a clock of an extremely low frequency, or a normal operation mode for operation by a clock of a normal frequency, which outputs a first control signal in accordance with a value set in the clock mode designation register when the extremely low speed mode is designated during an operation in the normal operation mode, a DRAM for holding, in the extremely low speed mode, data by being operated in a self-refresh mode, and outputting a confirmation signal indicating switching to the self-refresh mode, a DRAM control circuit for switching the DRAM to the self-refresh mode based on the first control signal, a ROM operated in the extremely low speed mode, a remap control circuit for controlling an address changing circuit based on the confirmation signal from the DRAM, and outputting a second control signal for switching a program execution address from the DRAM to an address of the ROM to control an address space in which a program is executed, and the address changing circuit for switching the address space based on the second control signal.

The microcontroller of the present invention further comprises an interrupt control circuit, wherein during an operation in the extremely low speed mode, when an interrupt signal indicating return to the normal operation mode is entered to the interrupt control circuit, the interrupt control circuit rewrites the value of the clock mode designation register to clock information corresponding to the normal operation mode to cause the clock control circuit to invalidate the first control signal, the DRAM control circuit accordingly releases the self-refresh mode of the DRAM, and notifies invalidation of the confirmation signal to the remap control circuit and, upon reception of the notice, the remap control circuit switches the second control signal to control the address changing circuit, and change a program execution address from the ROM to an address of the DRAM.

DETAILED DESCRIPTION OF THE PREFERRED EMBODIMENTS

Next, detailed description will be made of a specific example of the present invention with reference to the accompanying drawings.

Figure 3:
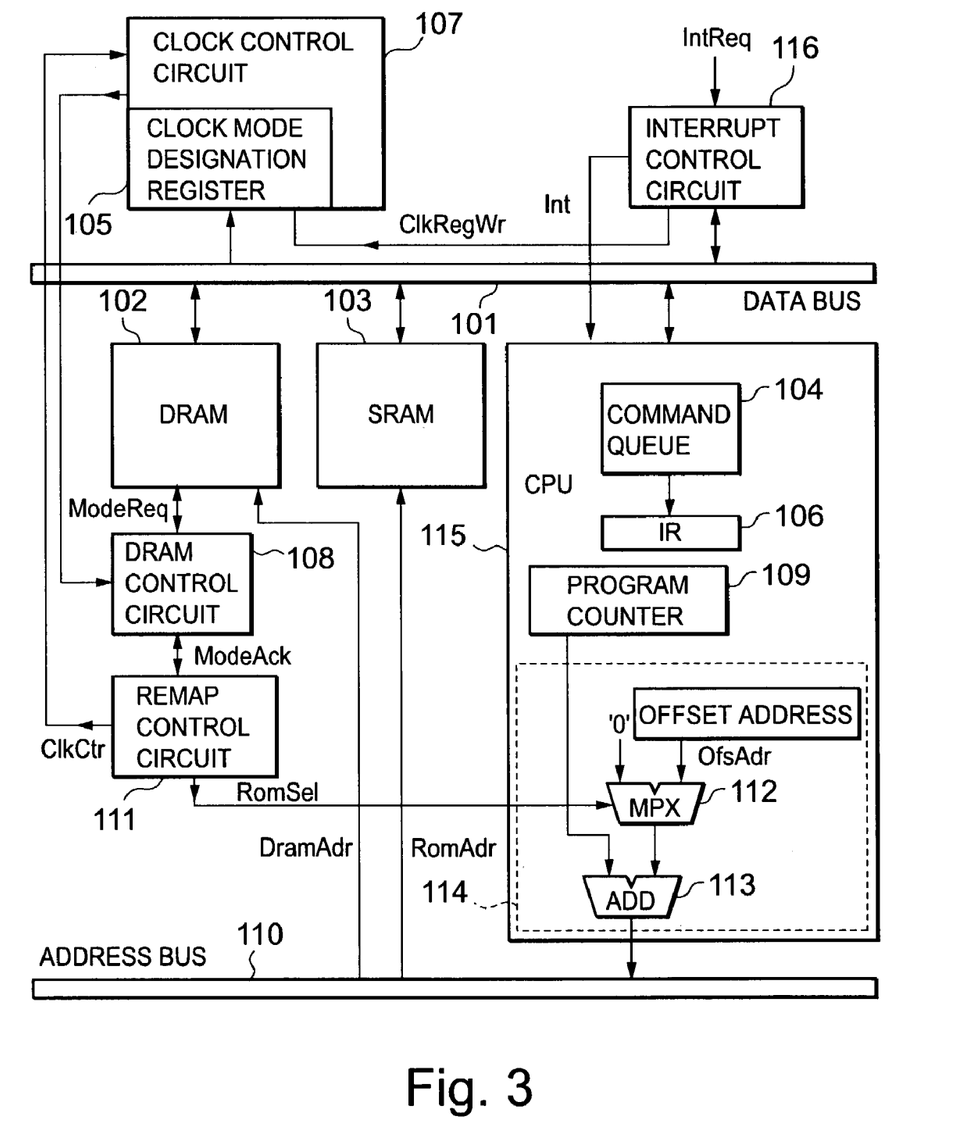
FIG. 3 is a block diagram of a microcontroller of a specific example according to the present invention.

FIG. 3 shows a block diagram of a microprocessor of a specific example according to the present invention. A CPU 115, a DRAM 102, a ROM 103, an interrupt control circuit 116, and a clock control circuit 107 incorporating a clock mode designation register 105 are connected to a data bus 101, and a not-shown SRAM or the like is also connected.

The DRAM 102 is basically similar to that of FIG. 1, but different in that it outputs a confirmation signal of switching to a self-refresh mode with respect to a ModeReq signal outputted from the clock control circuit 107 upon reception of designation of the clock mode designation register 105.

The ROM 103 is operated by low voltage, and a pattern area per bit is small. Thus, it can be set to a large capacity.

A command queue 104 is normally a FIFO queue, stores commands to be executed in order, and sends a command to be executed next to a command register IR 106. This command queue 104 includes a control circuit.

Figure 4:
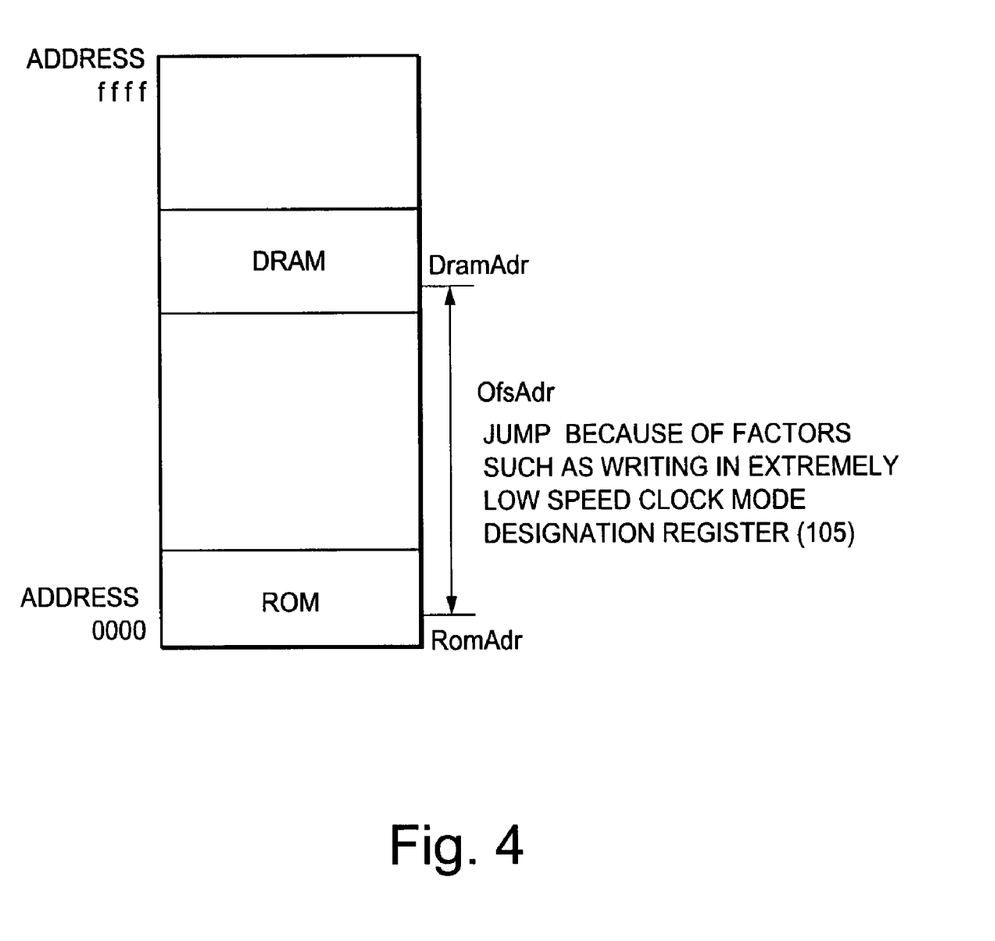
FIG. 4 is an explanatory view of an address space in the specific example of the present invention.

A remap control circuit 111 in the specific example has a function for controlling transfer between a DRAM and a ROM mainly in an address space. FIG. 4 is an explanatory view of the address space in the specific example. The remap control circuit 111 receives a confirmation signal ModeAck of switching of the DRAM 102 to an extremely low speed mode (self-refresh mode), and then outputs a signal Romsel for controlling a multiplexer MPX 112 in an address changing circuit 114.

The signal Romsel is for selecting an offset address OfsAdr or "0" at the multiplexer MPX 112. If the offset address OfsAdr is selected, an execution address is transferred to the DRAM 102. If "0" is selected, an execution address is transferred to the ROM 103. Such transfer is made for the purpose of executing a program in the ROM 103 when the RomSel signal is invalid (i.e., "0" is selected) during resetting such as power-on-resetting.

A separately installed loader or a loader in the ROM copies the program of the ROM into the DRAM 102, and transfers control to the DRAM 102 to execute the program at a high speed. Accordingly, as shown in FIG. 4, there are programs of identical contents side-by-side in the address space, which are separated by the offset address OfsAdr.

In the specific example, clock control signal ClkCtr outputted from the remap control circuit 111 is entered to the clock control circuit 107, and used for actually switching a clock from an extremely low speed to a normal speed, or controlling its reverse operation.

Addition of the above-described offset address OfsAdr or the like is executed by an adder ADD 113, and its added value is outputted to the address bus 110, whereby an address DramAdr in the DRAM 102 and an address RomAdr in the ROM 103 are supplied thereto. Even if there is a jump command in the command queue 104, in the specific example, since an address of the command is not directly set in a program counter, no problems occur irrespective of a relative or absolute address.

In the conventional microcontroller shown in FIG. 1, since the routine for switching from the extremely low speed mode to the normal mode is executed in the ROM, immediacy is lost in the switching to create problems such as communication errors. However, according to the specific example, processing from designation of switching to the normal mode to actual switching to this mode can be executed within delay time of a gate level.

By a command lastly executed in the DRAM 102, information regarding a clock frequency corresponding to the extremely low speed mode is set in the clock mode designation register 105. Then, the clock control circuit 107 enters an extremely low speed mode designation signal ModeReq to a DRAM control circuit 108, and the DRAM 102 receives this designation to switch to the extremely low speed mode.

The DRAM control circuit 108 outputs a confirmation signal ModeAck to notify completion of the switch. No new commands are executed in a period from reception of mode changing instruction to actual switching of an operation clock frequency to an extremely low speed frequency to output the confirmation signal, and all the above operations are finished within delay time of a hardware gate level. Thus, a next command of an address RomAdr=DramAdr OfsAdr+1 in the ROM can be executed with respect to a last command address DramAdr in the DRAM 102.

If the gate processing delay time cannot include sufficient spare time for an operation clock cycle, a command having standby time may be executed in the CPU. However, since the switching to the extremely low speed mode has been completed, sufficient room is normally generated for command reading from the ROM 103.

The specific example is characterized in that when the operation is returned from the extremely low speed mode to the normal mode, no interruption is executed with the CPU 115 but a ClkRegWr signal for rewriting held data is outputted from the interrupt control circuit 116 to the clock mode designation register 105 in the clock control circuit 107.

As described above with respect to the background of the invention, if there is no time for executing software interruption with the CPU which executes the program in the ROM in the extremely low speed mode, the interrupt control circuit 116 which receives an interrupt request signal IntReq determines its factor by an internal interrupt factor determination circuit 617 (see FIG. 6), and outputs a control signal ClkRegWr. By this signal, the data held in the clock mode designation register 105 is rewritten to be data corresponding to the normal mode.

Figure 6:
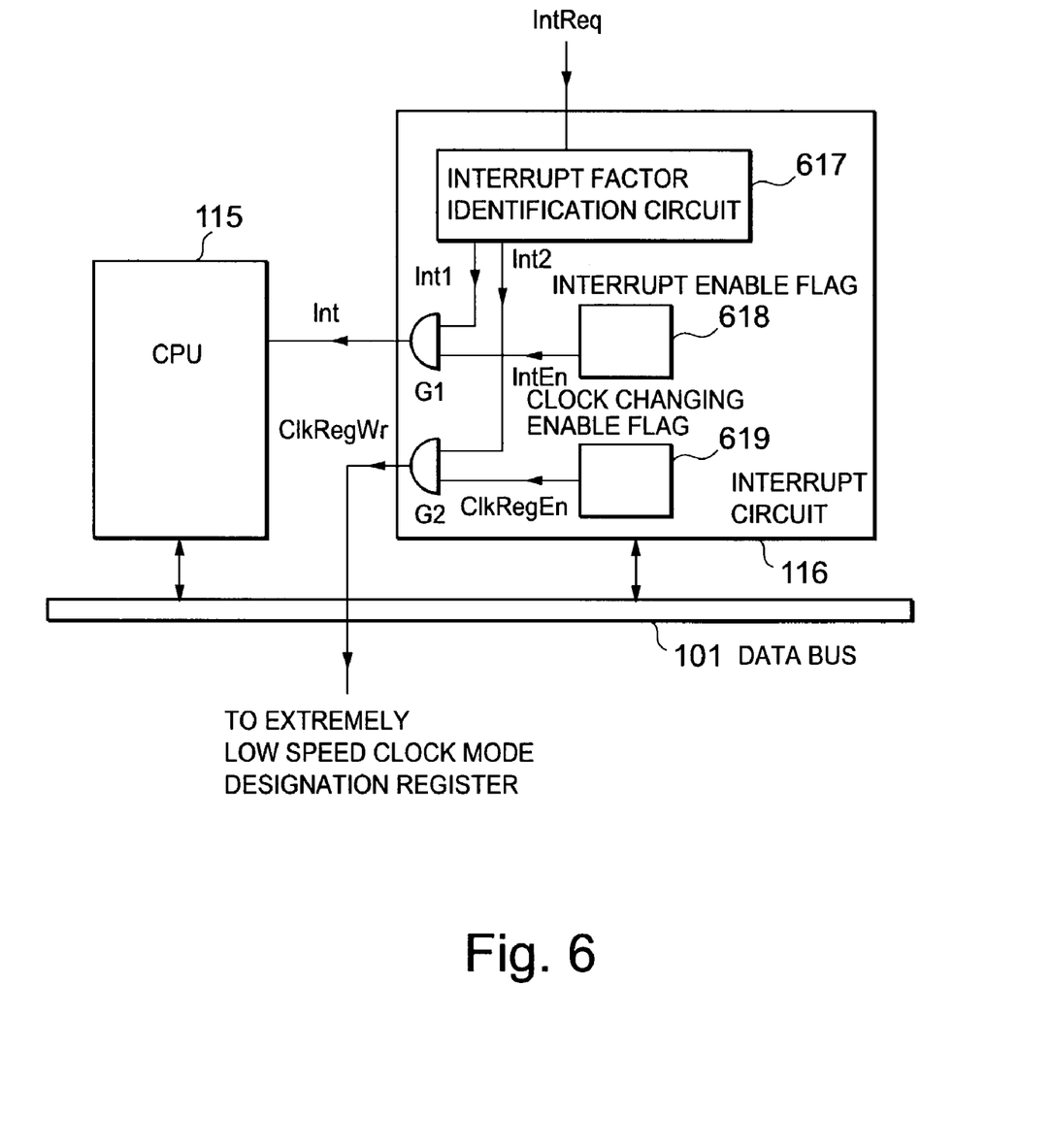
FIG. 6 is a block diagram of an interrupt control circuit in the specific example of the present invention.

FIG. 6 is a block diagram of the interrupt control circuit 116 according to an embodiment of the present invention. In this interrupt control circuit 116, an interrupt request identification circuit 617 which receives an interrupt request signal InReq outputs two signals in accordance with a type of interruption, and priority. In the case of a first signal Int 1, an interrupt enable signal IntEn is received from an interrupt enable flag 618, and an interrupt signal is outputted as an output of a gate G1 to the CPU 115. This is a normal interruption.

On the other hand, in the case of a second output Int 2, a clock changing enable signal ClkChgEn is received from a clock changing enable flag 619 and, as an output of a gate G2, a signal ClkRegWr for controlling the clock mode designation register 105 is outputted. The interrupt signals Int and ClkRegWr are independent of each other, and thus an interrupt routine and an extremely low speed clock can be independently set in the CPU 115. Therefore, the microcontroller of the specific example can process the interrupt routine in a normal clock mode after return from the extremely low speed mode to the normal operation mode.

The following process is carried out in order to return from the extremely low speed mode for executing the command in the ROM 103 to the normal operation mode for executing the command in the DRAM 102. By a last command in the ROM 103, a value is set in the clock mode designation register 105 to release the extremely low speed mode. Then, the clock control circuit 107 invalidates an extremely low speed mode designation signal ModeReq to the DRAM control circuit 108. In response, the DRAM control circuit 108 releases the extremely low speed mode (self-refresh mode) of the DRAM, and invalidates a confirmation signal ModeAck to notify completion of the release. After the invalidation of the confirmation signal, the remap control circuit 111 switches a control signal Romsel of the multiplexer MPX 112 of the address changing circuit 114 to select an address OfsAdr, and controls the address to be switched to an address in the DRAM 102. A control signal ClkCtr is entered to the clock control signal 107, and a clock frequency is returned to a normal clock frequency.

Figure 5:
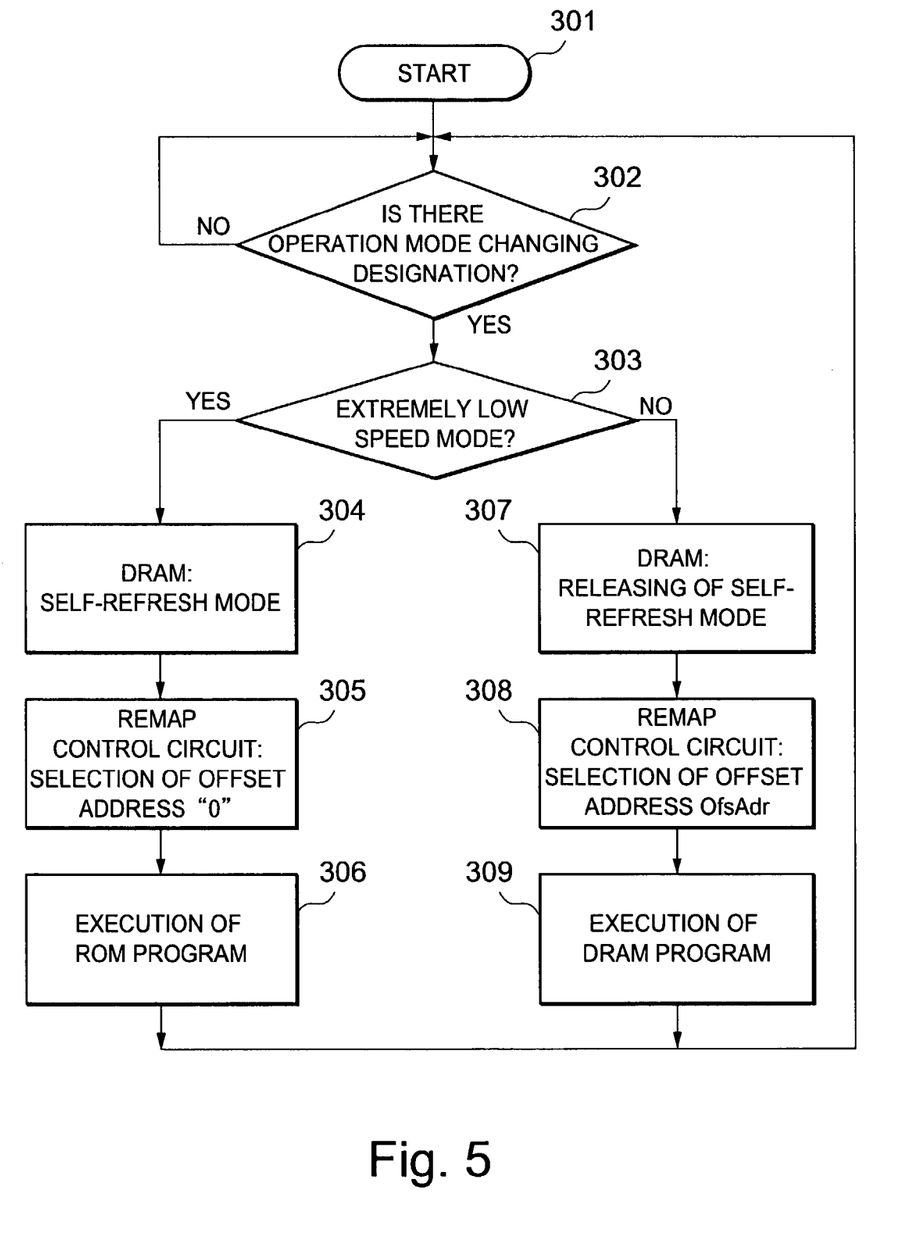
FIG. 5 is a flowchart of operation mode transition in the specific example of the present invention.

FIG. 5 is a flowchart showing operation mode transition according to the embodiment of the present invention. After a start (step 301), the CPU executes the loader in the ROM, copies a content of the ROM in the DRAM 102, and transfers control to the DRAM. Thus, according to the embodiment, an operation mode immediately after resetting is not an extremely low speed mode. Then, a normal operation mode is continued until the extremely low speed mode is designated (step 302). If there is operation mode changing designation in step 302, in step 303, a determination is made as to whether the extremely low speed mode is designated or not and, in accordance with its result, the processing is branched.

First, if the designation of the extremely low speed mode is determined, the DRAM 102 switches to a self-refresh mode (step 304). Upon reception of a confirmation signal ModeAck thereof, the remap control circuit 111 outputs a control signal to cause the address changing circuit 114 to select an offset address "0", and as a result a program is executed in the ROM 103 (step 306).

If the designation of the extremely low speed mode is not determined in step 303, i.e., return to the normal mode is designated, the DRAM 102 releases the self-refresh mode (step 307). After invalidation of the confirmation signal ModeAck, the remap control circuit 111 switches a control signal to cause the address changing circuit to select an offset address OfsAdr (step 308). As a result, a program is executed again in the DRAM 102 (step 309).

As described above in detail, according to the present invention, the microcontroller comprises the DRAM for holding, in the extremely low speed mode, data by being operated in the self-refresh mode, the DRAM control circuit for controlling the operation mode of the DRAM, the ROM operated in the extremely low speed mode, the clock control circuit provided with the clock mode designation register for storing the clock frequency information corresponding to the extremely low speed mode or the normal operation mode, the remap control circuit for controlling the address space in which the program is executed, and the address changing circuit. When the extremely low speed mode is designated in the normal operation mode, by setting a value corresponding to the extremely low frequency in the clock mode designation register, based on the first control signal outputted from the clock control circuit, the DRAM control circuit switches the DRAM to the self-refresh mode, and outputs the confirmation signal indicating the switch of the DRAM to the self-refresh mode. The remap control circuit controls the address changing circuit based on the confirmation signal, and outputs the second control signal for switching the program execution address from the DRAM to the address of the ROM. The microcontroller of the present invention further comprises the interrupt control circuit, wherein during the operation in the extremely low speed mode, when the interrupt signal indicating return to the normal operation mode is entered to the interrupt control circuit, the interrupt control circuit rewrites the value of the clock mode designation register to be the clock information corresponding to the normal operation mode to cause the clock control circuit to invalidate the first control signal. The DRAM control circuit accordingly releases the self-refresh mode of the DRAM, and notifies invalidation of the confirmation signal to the remap control circuit and, upon reception of the notice, the remap control circuit switches the second control signal to control the address changing circuit, and change the program execution address from the ROM to the address of the DRAM. Therefore, even if a switch is made to the extremely low speed mode, and the DRAM is operated in the self-refresh mode, and thus unable to operate as a normal memory, the program can be executed in the ROM without much use of an expensive SRAM. Moreover, since the time of switching from the normal mode to the extremely low speed mode is equal to the gate delay time, execution in the extremely low speed mode is possible from a next command. The same applies to the return from the extremely low speed mode to the normal mode.

The invention claimed is:

1. A microcontroller comprising:
a clock control circuit provided with a clock mode designation register for storing clock frequency information corresponding to an extremely low speed mode for an operation by a clock of an extremely low frequency, or a normal operation mode for operation by a clock of a normal frequency, which outputs a first control signal in accordance with a value set in the clock mode designation register when the extremely low speed mode is designated during an operation in the normal operation mode;
a dynamic random access memory (DRAM)for holding, in the extremely low speed mode, data by being operated in a self-refresh mode, and outputting a confirmation signal indicating switching to the self-refresh mode;
a DRAM control circuit for switching the DRAM to the self-refresh mode based on the first control signal;
a read-only memory (ROM)operated in the extremely low speed mode;
an address changing circuit; and
a remap control circuit for controlling the address changing circuit based on the confirmation signal, and outputting a second control signal for switching a program execution address from the DRAM to an address of the ROM to control an address space in which a program is executed, the address changing circuit switching the address space based on the second control signal,
wherein when the extremely low speed mode is designated, the address changing circuit is controlled in a manner that the first and second control signals and the confirmation signal are outputted while one command in the DRAM is executed to set a value in the clock mode designation register, and a command next to the one command is executed in the ROM based on the second control signal.

2. The microcontroller according to claim 1, further comprising an interrupt control circuit,
wherein during an operation in the extremely low speed mode, when an interrupt signal indicating return to the normal operation mode is entered to the interrupt control circuit, the interrupt control circuit rewrites the value of the clock mode designation register to be clock information corresponding to the normal operation mode to cause the clock control circuit to invalidate the first control signal, the DRAM control circuit accordingly releases the self-refresh mode of the DRAM and notifies invalidation of the confirmation signal to the remap control circuit and, upon reception of the notice, the remap control circuit switches the second control signal to control the address changing circuit and change a program execution address from the ROM to an address of the DRAM.

3. A microcontroller comprising:
a central processing unit (CPU) having an extremely low speed mode and a normal mode, the CPU executing a program based on data received by said CPU;
a ROM storing the data;
a DRAM self-refreshing the data in response to a self-refresh signal, the DRAM generating a confirmation signal when self-refreshing the data;
a DRAM control circuit connected to the DRAM, the DRAM control circuit outputting the self-refresh signal in response to a first control signal;
a clock control circuit connected to the DRAM control circuit, the clock control circuit generating the first control signal when the extremely low speed mode is designated during an operation by the CPU in the normal mode; and
a remap control circuit connected to the CPU, the remap control circuit generating a second control signal in response to the confirmation signal,
wherein the CPU switches a program execution address from the DRAM to the ROM in response to the second control signal, and
wherein one command in the RAM is executed while the CPU is operating in the extremely low speed mode, and then a command next to the one command is executed in the ROM based on the second control signal.

4. A microcontroller according to claim 3, wherein the clock control circuit includes a clock mode register for storing clock frequency information corresponding to the extreme low speed mode and the normal mode.

5. A microcontroller according to claim 3, wherein the CPU includes an offset signal generator and a multiplexer selecting an address received thereby in response to the second control signal.

6. A microcontroller according to claim 3, wherein the CPU includes a program counter designating an address of a command to be executed in a next sequence.

7. A microcontroller according to claim 3, wherein the CPU includes a command queue storing a plurality of commands to be executed.

8. A microcontroller according to claim 7, wherein the command queue is constituted of a first-in first-out memory.

9. A microcontroller according to claim 7, wherein the CPU further includes a command register connected to the command queue.

10. A microcontroller according to claim 9, wherein the command register stores a command to be executed in a next sequence.

11. A microcontroller according to claim 3, further comprising an interrupt control circuit connected to the CPU, the interrupt control circuit generating an interrupt signal to the CPU in response to an interrupt request signal received thereby.

12. A microcontroller according to claim 3, further comprising an interrupt control circuit connected to the clock control circuit, the interrupt control circuit generating a third control signal to the clock control circuit in response to an interrupt request signal received thereby.

* * * * *